(12) United States Patent
Arias-Acosta et al.

(10) Patent No.: US 10,539,204 B2
(45) Date of Patent: Jan. 21, 2020

(54) DAMPING AND SUPPORT DEVICE FOR ELECTRICAL EQUIPMENTS

(71) Applicant: ITT MANUFACTURING ENTERPRISES LLC, Wilmington, DE (US)

(72) Inventors: Juan Arias-Acosta, Erlangen (DE); Helmut Holler, Berlin (DE); Antonios Kopanoudis, Erlangen (DE); Christos Kotanidis, Erlangen (DE); Shubin Ruan, Williamsville, NY (US); Jörg Teichmann, Dallgow-Döritz (DE); Tom Zemanek, Laguna Hills, CA (US); Achim Von Seck, Wachenroth (DE)

(73) Assignee: ITT Manufacturing Enterprises LLC, Wilmington, DE (US)

( * ) Notice: Subject to any disclaimer, the term of this patent is extended or adjusted under 35 U.S.C. 154(b) by 0 days.

(21) Appl. No.: 16/166,841

(22) Filed: Oct. 22, 2018

(65) Prior Publication Data

US 2019/0257382 A1 Aug. 22, 2019

Related U.S. Application Data

(63) Continuation of application No. 15/514,212, filed as application No. PCT/EP2015/071541 on Sep. 21, 2015, now abandoned.

(Continued)

(51) Int. Cl.
*H02G 7/14* (2006.01)
*F16F 15/02* (2006.01)
(Continued)

(52) U.S. Cl.
CPC .............. *F16F 15/022* (2013.01); *F16F 7/14* (2013.01); *F16F 15/0235* (2013.01); *H02B 1/54* (2013.01); *F16F 7/116* (2013.01); *F16F 9/103* (2013.01)

(58) Field of Classification Search
CPC ... H02B 1/54; H02B 1/26; H02B 1/30; H02B 1/40; H02B 1/46; H02B 1/48;
(Continued)

(56) References Cited

U.S. PATENT DOCUMENTS

| 3,794,277 A | 2/1974 | Smedley | F16F 7/127 |
| | | | 174/151 R |
| 3,911,199 A | 10/1975 | Fischer | |

(Continued)

FOREIGN PATENT DOCUMENTS

| CL | 37334 | 6/1990 |
| CL | 39730 | 6/1992 |

(Continued)

OTHER PUBLICATIONS

Seismic Testing of a Building Structure With a Semi-Active Fluid Damper Control System; M.D. Symands et al.; Earthquake Engineering and Structural Dynamics; vol. 26; 759-777; 1997: 20 pages.
(Continued)

*Primary Examiner* — Angel R Estrada
(74) *Attorney, Agent, or Firm* — Barclay Damon, LLP (57) ABSTRACT

A device (1) for supporting an equipment (2), especially an upstanding electrical equipment from vibrations is disclosed. The device comprises a base plate (3), a set of support adapters (7), a set of viscous dampers (5) connecting the base plate to the support adapters and a set of wire rope dampers (6), wherein the set of wire rope dampers bear the base plate and connect the base plate to the support adapters. Further, the set of support adapters connect the viscous
(Continued)

dampers and the wire rope dampers to a foundation plate by bolts or alternatively to a shake table via shake table adapters. A set of angular fixtures connect the support adapters to the base plate by means of the viscous dampers. In a preferred embodiment of the device the base plate is orthogonally shaped.

19 Claims, 4 Drawing Sheets

Related U.S. Application Data (60) Provisional application No. 62/054,463, filed on Sep. 24, 2014.

(51) Int. Cl.
    *H02B 1/54*     (2006.01)
    *F16F 7/14*     (2006.01)
    *F16F 15/023*     (2006.01)
    *F16F 7/116*     (2006.01)
    *F16F 9/10*     (2006.01)

(58) Field of Classification Search
CPC ........ F16F 15/022; F16F 7/14; F16F 15/0235; F16F 7/116; F16F 9/103; F16F 15/00; F16F 15/002; F16F 15/02; H02G 7/125; H02G 7/14
USPC ......... 174/42, 480, 481, 544, 535, 520, 559; 267/136, 137; 248/622, 367, 335, 560, 248/562, 566; 52/167.1, 167.4, 167.7, 52/167.8
See application file for complete search history.

(56) References Cited

U.S. PATENT DOCUMENTS

| | | |
|---|---|---|
| 3,973,078 A | 8/1976 | Wolf et al. |
| 4,108,270 A | 8/1978 | Mifsud |
| 4,336,917 A | 6/1982 | Phillips |
| 5,020,644 A | 6/1991 | Novoa ............... F16F 7/10 188/268 |
| 5,042,024 A | 8/1991 | Kurosawa ............ G11B 33/08 720/600 |
| 5,169,110 A | 12/1992 | Snaith ................ F16F 7/14 248/570 |
| 5,441,243 A | 8/1995 | Loziuk |
| 5,442,883 A | 8/1995 | Nishimura et al. |
| 5,509,238 A | 4/1996 | Scalfati ............... E04H 9/021 52/167.4 |
| 5,522,585 A | 6/1996 | Loziuk |
| 5,549,285 A | 8/1996 | Collins |
| 5,559,671 A | 9/1996 | Dan et al. |
| 5,791,636 A | 8/1998 | Loziuk |
| 5,797,227 A | 8/1998 | Garza-Tamez |
| 5,907,880 A | 6/1999 | Durazzani et al. |
| 6,098,966 A | 8/2000 | Latvis, Jr. et al. |
| 6,244,579 B1 | 6/2001 | Latvis, Jr. |
| 6,286,805 B1 | 9/2001 | Bunn et al. |
| 6,290,217 B1 | 9/2001 | Schneider et al. |
| 6,406,011 B1 | 6/2002 | Kosar et al. |
| 6,530,563 B1 | 3/2003 | Miller et al. |
| 6,585,241 B1 | 7/2003 | Hartl et al. |
| 6,843,613 B2 | 1/2005 | Gelfand et al. |
| 7,108,111 B2 | 9/2006 | Spyche, Jr. et al. |
| 7,142,427 B2 | 11/2006 | Reents ............... H01L 23/4093 174/252 |
| 7,325,792 B2 | 2/2008 | Siino et al. |
| 7,337,586 B2 | 3/2008 | Lin et al. |
| 7,510,147 B2 | 3/2009 | Haber ............... B64D 1/02 244/137.1 |
| 7,852,274 B2 | 12/2010 | Madden, Jr. et al. |
| 7,990,639 B2 | 8/2011 | Ouellette et al. |
| 8,235,351 B1 | 8/2012 | Van Lear |
| 8,444,121 B2 | 5/2013 | Hadden et al. |
| 8,462,510 B2 | 6/2013 | Lin ................ H01L 23/32 174/16.3 |
| 9,255,399 B2 | 2/2016 | Ruan ............... F16F 15/022 |
| 9,809,975 B2 | 11/2017 | Ruan ............... F16F 15/022 |
| 2003/0016996 A1 | 1/2003 | Gelfand et al. |
| 2003/0132077 A1 | 7/2003 | Davis ............... F16F 7/10 188/380 |
| 2004/0159995 A1 | 8/2004 | Pavuk ............... B50H 5/00 267/248 |
| 2005/0109912 A1 | 5/2005 | Mulder |
| 2006/0201759 A1 | 9/2006 | Spyche, Jr. et al. |
| 2006/0254869 A1 | 11/2006 | Wang ............... F16F 15/067 188/376 |
| 2007/0258861 A1 | 11/2007 | Barket, Jr. et al. |
| 2008/0151685 A1 | 6/2008 | Wang ............... F16F 15/067 366/217 |
| 2010/0117275 A1 | 5/2010 | Nakamura ............ B60N 2/502 267/133 |
| 2010/0149059 A1 | 6/2010 | Patel |
| 2011/0133078 A1 | 6/2011 | Barket, Jr. et al. |
| 2011/0180685 A1 | 7/2011 | Borgen |
| 2012/0091311 A1 | 4/2012 | Rizk et al. |
| 2012/0175489 A1 | 7/2012 | Taylor ............... F16F 15/067 248/563 |
| 2012/0204509 A1 | 8/2012 | Lim ............... E04H 9/021 52/393 |
| 2012/0248282 A1 | 10/2012 | Malchev et al. |
| 2013/0068918 A1 | 3/2013 | Mulder |
| 2014/0008851 A1 | 1/2014 | Chapman ............ F16M 11/043 267/140.11 |
| 2014/0060296 A1 | 3/2014 | Monteil et al. |
| 2014/0305334 A1 | 10/2014 | Blase ............... B61C 17/00 105/26.05 |

FOREIGN PATENT DOCUMENTS

| | | |
|---|---|---|
| CL | 52398 | 10/2011 |
| CL | 52267 | 2/2012 |
| CN | 101882480 A | 11/2010 |
| CN | 201971165 U | 9/2011 |
| CN | 103410605 A | 11/2013 |
| DE | 10 2006 054 274 B3 | 12/2007 |
| EP | 0 103 188 B1 | 12/1986 |
| EP | 0 655 111 B1 | 8/1996 |
| EP | 0 813 203 A1 | 12/1997 |
| EP | 1 122 458 A1 | 8/2001 |
| EP | 1 138 974 A2 | 10/2001 |
| EP | 1 140 602 B1 | 7/2003 |
| EP | 1 134 548 B1 | 2/2005 |
| EP | 1 668 760 B1 | 5/2008 |
| EP | 2 107 268 B1 | 11/2010 |
| EP | 1 481 132 B1 | 10/2012 |
| EP | 2 092 836 B1 | 3/2013 |
| EP | 2 889 877 A1 | 7/2015 |
| JP | 2007-39854 | 2/2007 |
| JP | 2012-246998 | 12/2012 |
| WO | WO 93/12367 | 6/1993 |
| WO | WO 2008/022486 A1 | 2/2008 |
| WO | WO 2009/113868 A1 | 9/2009 |
| WO | WO 2010/075109 A1 | 7/2010 |
| WO | WO 2011/151254 A1 | 12/2011 |
| WO | WO 2012/081423 A2 | 4/2012 |
| WO | WO 2012/152826 A1 | 11/2012 |

OTHER PUBLICATIONS

Study of Wire Rope Systems for Seismic Protection of Equipment to Buildings; G.F. Demetriades et al.; Eng. Struct. 1993, vol. 15, No. 5: pp. 321-334: 14 pages.

Passive Fluid Viscous Damping Systems for Seismic Energy Dissipation: ISET Journal of Earthquake Technology; Paper No. 382; vol. 35; No. 4; Dec. 1998; pp. 185-206; 22 pages.

(56) References Cited

OTHER PUBLICATIONS

The Application of Energy Dissipating Damping Devices to an Engineered Structure or Mechanism; Douglas P. Taylor, President; Taylor Devices, Inc.; www.shockandvibration.com; 2010; 60 pages.
European Search Report for EP 14 19 4009 8; dated Jun. 3, 2015; 10 pages.
Euoprean Patent Application No. PCT/EP2015/071541; Filed Sep. 21, 2015; 24 pages.
Chilean Office Action for CL 201403245; dated Dec. 14, 2016; 7 pages.
New Zealand Examination Report for NZ 702029; dated Mar. 29, 2017; 6 pages.
Chilean Office Action for CL 3245-2014; dated Jun. 2017; 7 pages.
International Search Report and Written Opinion for PCT/EP2015/071541; dated Dec. 11, 2015; 9 pages.
Chilean Office Action for CL 201700693; dated Mar. 28, 2019; 12 pages.

DAMPING AND SUPPORT DEVICE FOR ELECTRICAL EQUIPMENTS

CROSS REFERENCE TO RELATED APPLICATION(S)

This application is a continuation of U.S. patent application Ser. No. 15/514,212, filed Mar. 24, 2017, which is a national stage application under 35 U.S.C. § 371 of International Application No. PCT/EP2015/071541, filed Sep. 21, 2015, which claims priority under applicable portions of 35 U.S.C. § 119 of U.S. Patent Application Ser. No. 62/054,463, filed Sep. 24, 2014, the entire contents of each application being incorporated by reference herein.

TECHNICAL FIELD

The present technology relates to a device that provides damping and support to electrical equipments and more specifically relates to a device that provides damping and support to upstanding high voltage components to protect them from vibrations, for example, seismic vibrations.

BACKGROUND OF THE INVENTION

Large upstanding electrical equipments require support and damping means for reducing vibrations caused due to various reasons, for example, seismic vibrations, earthquakes, vibrations during operation of the equipment and other such shaking movements. Without sufficient damping and support, excessive motion of the vertical upstanding equipment, relative to the main base frame, could occur when the frequency of the ground motion is such as to cause amplification of the vertical upstanding equipment motion. Damping is one of many different methods that have been proposed for allowing a structure to achieve optimal performance when it is subjected to seismic, wind storm, blast or other types of transient shock and vibration like disturbances.

Devices for control of mechanical vibrations by use of dampers are known in the literature.

Prior art U.S. Pat. No. 3,973,078 is of interest with respect to this patent application. It discloses an energy absorbing device, such as a liquid filled vibration damper assembly, for preventing excessive relative motion between the lower supporting plate of the upstanding column, supporting electrical equipment, and the adjacent lower-disposed main supporting framework structure. Preferably, the energy absorbing device is a liquid filled dash-pot assembly which is utilized at one or more locations extending between the lower supporting plate member of each upstanding column structure and the lower disposed main supporting framework.

Prior art U.S. Pat. No. 3,911,199 is also of interest with respect to this patent application. It discloses a seismic motion-damper for upstanding electrical equipment comprising an inertia element disposed within a container containing a fluid liquid attached to an upper portion of upstanding electrical equipment. Said damper is tuned so as, by utilizing sympathetic vibrations, tends to cancel out seismic vibrations, which otherwise could damage the electrical equipment.

There still exists a need for a simpler, more robust and affordable damping solution for electrical equipment to protect it from vibrations.

SUMMARY OF THE INVENTION

It is an object of the invention to provide for a robust yet simple damping and support structure for electrical equipment.

The object of the invention is achieved by a device for supporting an equipment by implementation of viscous dampers together with wire rope dampers arrangement with optimized positioning. The device comprises a base plate, a foundation plate, a set of viscous dampers connecting the base plate to the foundation plate and a set of wire rope dampers, wherein the set of wire rope dampers bear the base plate and connects the base plate to the foundation plate.

Viscous dampers operate on the principle of fluid flow through orifices. Viscous damping is caused by such energy losses as occur in liquid lubrication between moving parts or in a fluid forced through an orifice or a small opening by a piston. The damper typically contains a piston inside a cylinder filled with viscous fluid. Small ports or holes allow fluid to move back and forth in the cylinder, but the bulk of the fluid resists any movement of the piston.

Wire rope dampers are a kind of dampers made of coiled wire ropes that possess elastic and energy dissipation characteristics and are flexible enough to absorb the energy that causes vibrations to the equipment.

The viscous dampers supplement the damping from the wire rope dampers. Viscous dampers alone are not able to support the equipment. They only provide additional damping. The use of these two kinds of dampers together along with their optimized configuration (position of the wire ropes, number of viscous dampers) provide an enhanced damping solution giving more than twice better results than if the wire rope dampers were used alone. Moreover, it also ensures cost savings through the adaptability of the device to different equipment characteristics. Therefore, arranging viscous dampers together with the wire rope dampers helps to deal with increased damping requirements by using a cost-optimized arrangement.

The arrangement of the device should be optimized based on the characteristics of the equipment. Parameters for optimization based on current equipment needs are, for example, type of wire ropes or wire rope dampers, type of viscous dampers, the number of viscous dampers per support adaptor, for instance, at least one and up to five, the angle of viscous dampers or the position of the wire rope dampers along the axis of the center towards the support adapters and extending to the viscous dampers.

The arrangement should be optimized to achieve the required damping as per equipment's needs in relation to minimizing the amount of viscous dampers and in addition to minimizing the costs of the device.

In one embodiment of the invention the device further comprises a set of support adapters for connecting the viscous dampers and the wire rope dampers to the foundation plate. The support adapters offer a firm grip between the dampers and the foundation plate. It prevents the dampers from slipping on the foundation plate due to vibrations.

In another embodiment of the device at least one viscous damper and at least one wire rope damper are connected to the same support adapter. This provides the most optimized arrangement of dampers and support adapters by reducing the number of support adapters needed for the device. This leads to cost optimization for the device.

The viscous dampers connect the base plate to the support adapter. The support adaptor hosts both viscous dampers and wire rope dampers and further connects them to the foundation plate through bolts. The foundation type is not within the scope of this application.

In an alternative embodiment of the device, the device further comprises a set of shake table adapters, wherein the shake table adapters connect the support adapters to a shake table. Shake tables are used for testing the device for its ability to withstand vibrations. Shake tables induce vibrations into the device. Shake table adapters in the device provides an attaching means for attaching the support adapters to a shake table. This feature makes the device connectable to a shake table for testing purposes.

In a preferred embodiment of the device the base plate is orthogonally shaped. An orthogonal base plate provides a most suitable surface for attaching the dampers to the flat edges. Moreover using an orthogonal shape for the base plate ensures the most optimum arrangement of dampers around and below the base plate that can provide the maximum support and resistance against vibrations.

In another embodiment the device further comprises a set of angular fixtures connecting the foundation plate to the base plate by means of the viscous dampers. The angular fixtures have two surfaces at right angles to each other. One surface is affixed on to the surface of the base plate, and the other surface, which is perpendicular to the first surface, provides a flat fixing surface for one end of each of the viscous dampers. The other ends of the viscous dampers are attached to the support adapter. The angular fixture helps the dampers grasp the base plate firmly. It also makes it possible to align the viscous dampers at a desired angle to the foundation plate.

In an embodiment, the support adapters have a hole pattern. The hole pattern in the support adaptors and the angular fixtures is arranged in a way that any number (from 1 up to 5) of viscous dampers shall be able to be adapted symmetrically to the center of the adaptors. Hence, the same elements can be used for different applications and the redesign of these parts is not essential which further decreases costs.

In a preferred embodiment the set of viscous dampers constitutes up to five viscous dampers per support plate. Having too many viscous dampers would increase the cost of the device. Five viscous dampers per support adapter would provide the necessary and sufficient support without increasing the cost of the device exponentially.

In an embodiment of the device, the equipment is one of a double and single chamber life tank high voltage AC circuit breaker, HVDC high speed switches, high voltage arresters, high voltage disconnectors with a T-type steel support, HVDC voltage dividers, high voltage single stand bus support, high voltage earthing switch or a high voltage pantograph. The equipment can also be any other equipment that needs protection and damping against vibrations.

In yet another embodiment the wire rope damper is connected to the base plate at a base plate connection point and the base plate comprises a centre and an outer edge, and wherein the distance between the base plate connection point and the centre of the base plate is lesser than the distance between the base plate connection point and the outer edge of the base plate. Positioning of the wire ropes towards the center of the base plate provides the most optimum support and the damping action is more pronounced.

Positioning of the wire rope damper system in the manner mentioned above allows for higher displacements through rocking motions up to maximum limits of the viscous dampers and as a result allows for maximum additional damping from the viscous dampers.

In an exemplary device the equipment is a circuit breaker, Siemens 3AP3FI, the viscous dampers that are used are Enidine LD2418810E and the wire rope dampers are Enidine WR4020008 equivalent.

An exemplary device has a height of 6 m and weight of 5 tons. It provides a 30% damping action to a rocking movement.

In a preferred embodiment of the device, the viscous dampers are arranged at an angle of 77 degrees to the foundation plate. Optimized positioning and damper mechanical characteristics can be studied and developed through non-linear time history analysis and calibrated to a reference shake table test in order to arrive at the optimum device characteristics. Angles other than 77 degrees is also conceivable based on the desired damping characteristics needed.

BRIEF DESCRIPTION OF THE DRAWINGS

The above-mentioned and other features of the invention will now be addressed with reference to the accompanying drawings of the present invention. The illustrated embodiments are intended to illustrate, but not limit the invention. The drawings contain the following figures, in which like numbers refer to like parts, throughout the description and drawing.

DETAILED DESCRIPTION

Figure 1:
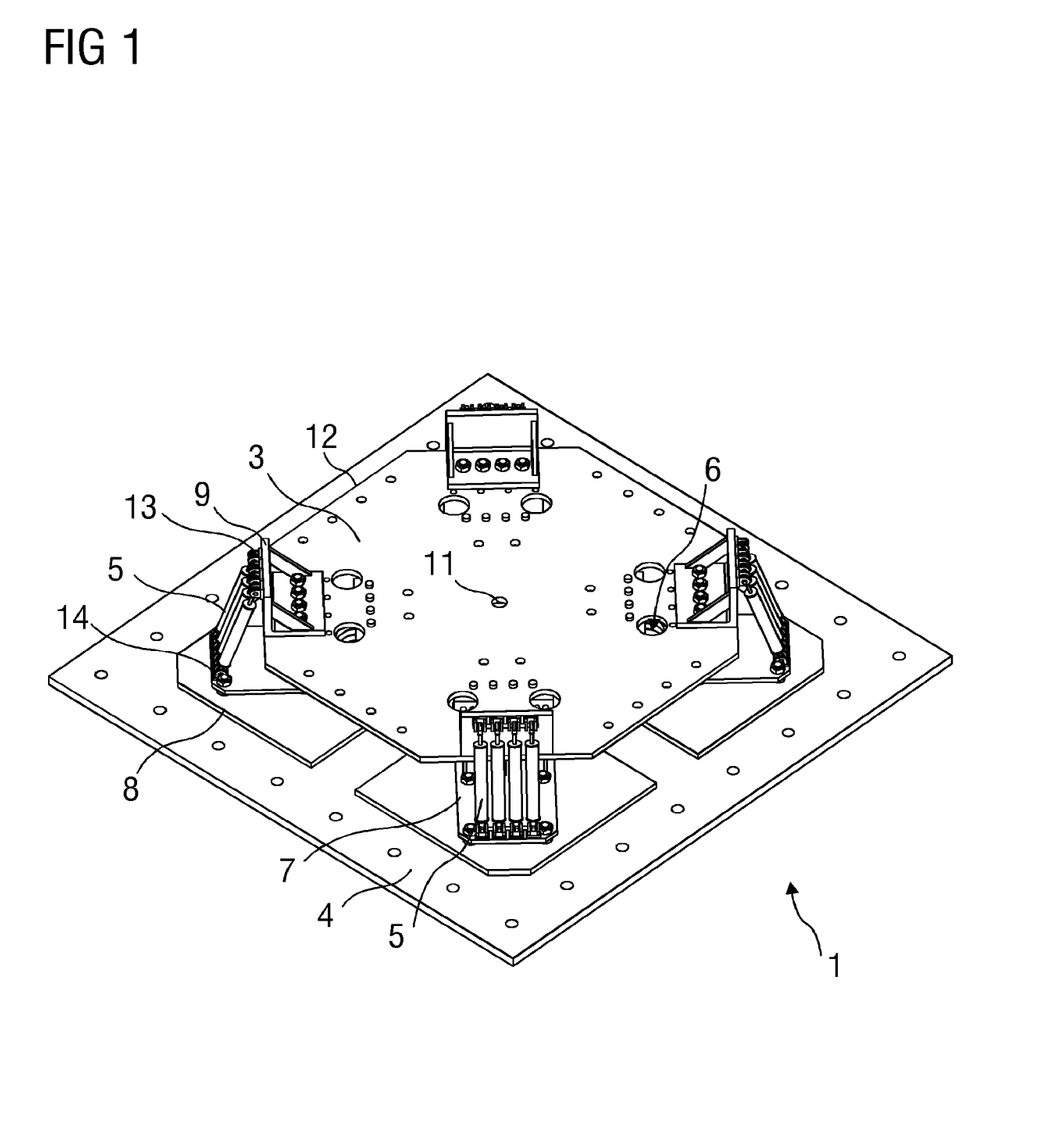
FIG. 1 is a schematic diagram showing a device for supporting an upstanding electrical equipment.

As seen in FIG. 1, the device 1 comprises a base plate 3 and a foundation plate 4. The equipment 2 (not shown in FIG. 1) is mounted on the base plate 3. The base plate 3 is supported on the foundation plate 4 by means of a set of viscous dampers 5 and a set of wire rope dampers 6. In other words the base plate 3 is borne by the foundation plate 4 wherein the set of viscous dampers 5 connect the base plate 3 to the foundation plate 4, and the set of wire rope dampers 6 bear the base plate 3 and support it on the foundation plate 3. The set of viscous dampers 5 are connected to the base plate 3 through a set of angular fixtures 9. The point of connection of the viscous damper 5 to the angular fixture 9 is called as the angular fixture connection point 13.

Also seen from the FIG. 1 are the set of support adapters 7. The support adapters 7 support the viscous dampers 5 and the wire rope dampers 6 on the foundation plate 4. The support adapters 7 ensure a close fit between the dampers 5, 6 onto the foundation plate 4. The support adapters 7 prevent the dampers 5, 6 from sliding or moving on the foundation plate 4 due to vibrations. The point of connection of the viscous damper 5 to the support adapter 7 is called as the support adapter connection point 14.

The foundation plate 4 shown in FIG. 1 can also be a shake table. For performing a shake table test, the device 1 is mounted on a shake table. For mounting the device 1 on a shake table the device is provided with a set of shake table adapters 8 which hold the arrangement of the base plate 3 and the dampers 5, 6 together providing a firm support and contact with the shake table during the shake table test.

The foundation plate 4 and the shake table adapters 8 can vary depending on the foundation type and the connection of the foundation to the support adapter 7 and is not limited to the depiction of FIG. 1. According to FIG. 1 the device 1 is attached to a foundation plate 4 or a shake table surface by means of the shake table adapters 8. Thus, the shake table adapters 8 connect the shake table to the device 1 or the foundation plate 4 to the device 1. However, in other circumstances such as in an application on site, it can be the case that the support adapters (7) are connected straight to a concrete foundation through anchor bolts without any shake table adapters (8).

Figure 2:
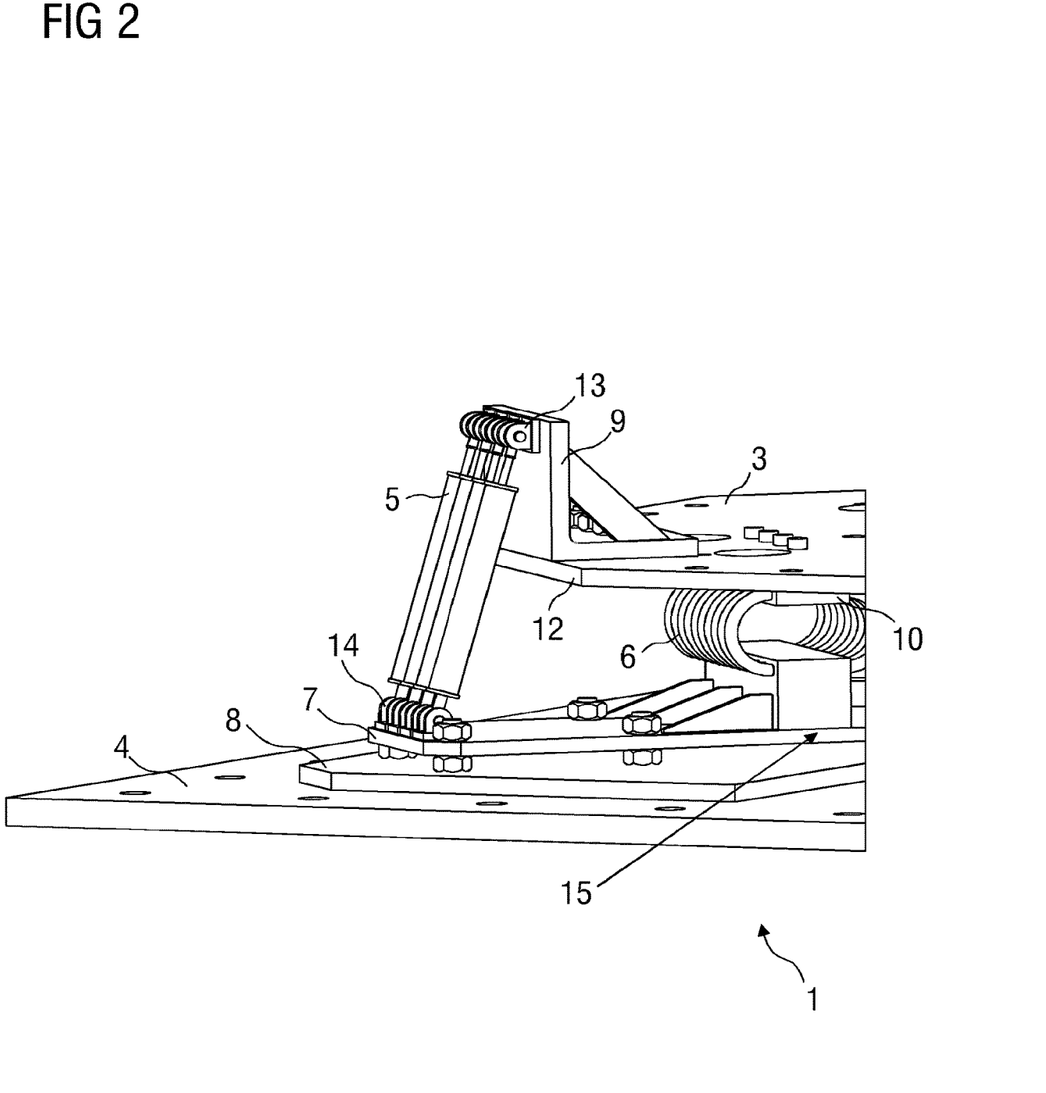
FIG. 2 is another schematic view of the device for supporting an upstanding electrical equipment.

FIG. 2 shows an isometric view of the device 1. The foundation plate 4 can be seen at the base of the device 1. The shake table adapter 8 is removably fixed to the foundation plate 4. On the shake table adapter 8 the support adapter 7 is affixed. The viscous damper 5 is connected to the support adapter 7 at the support adapter connection point 14. The viscous damper 5 is connected to the angular fixture 9 at the angular fixture connection point 13 which lies on one of the perpendicular surfaces of the angular fixture 9. The viscous damper 5 is arranged at an angle to the support adapter 7 and thus to the foundation plate 4. In a best mode the angle between the viscous damper 5 and the support adapter 7 or the foundation plate 4 is 77 degrees. The other perpendicular surface of the angular fixture 9 is aligned with the surface of the base plate 3 and connected to it.

Also seen in FIG. 2 is the wire rope damper 6. The wire rope damper 6 is present below the base plate 3 and it bears the base plate 3 on the foundation plate 4. The wire rope damper 4 is connected to the base plate 3 at the base plate connection point 10 and to the foundation plate at the foundation plate connection point 15. In an embodiment the foundation plate connection point 15 lies on the support adapter 7 thus the wire rope damper 4 is connected to the foundation plate 4 through the support adapter 7. The base plate outer edge 12 forms the edge of the base plate 3. The base plate centre 11 is not seen in FIG. 2.

Figure 3:
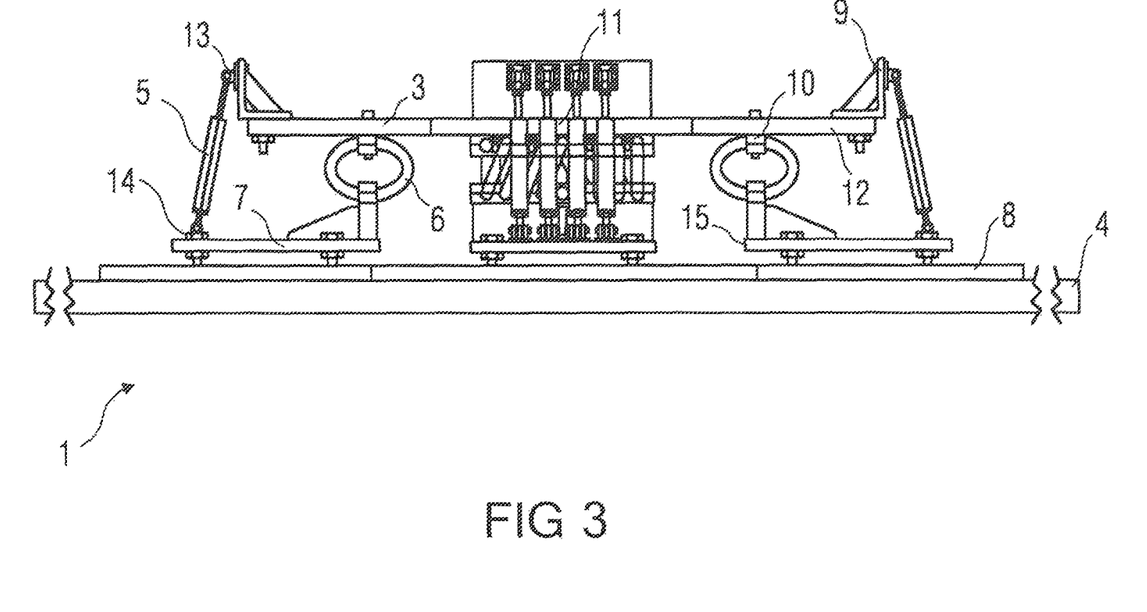
FIG. 3 is a side view of the device for supporting an electrical equipment.

FIG. 3 shows a side view of the device 1. The viscous dampers 5 are arranged at an angle to the support adapters 7. The support adapters 7 are affixed to the shake table adapters 8 by means of fixing elements or screws. The shake table adapters 8 are further removably affixed to the foundation plate 4 as seen in FIG. 3. At the time of a shake table test the shake table adapters 8 are fixed to the shake table.

The support adapters 7 are bearing the viscous dampers 5 and the wire rope dampers 6. The viscous dampers 5 are connected to the support adapters 7 at the support adapter connection point 14 and to the angular fixtures 9 at the angular fixture connection point 13. The wire rope dampers 6 are bearing the base plate 3 and are connected to the base plate 3 at the base plate connection point 10. The wire rope dampers 6 are affixed at the foundation plate connection point 15 through the support adapters 7. The base plate centre 11 is the point lying at the centre of the base plate 3. The base plate outer edge 12 forms the outermost border or the edge of the base plate 3.

Figure 4:
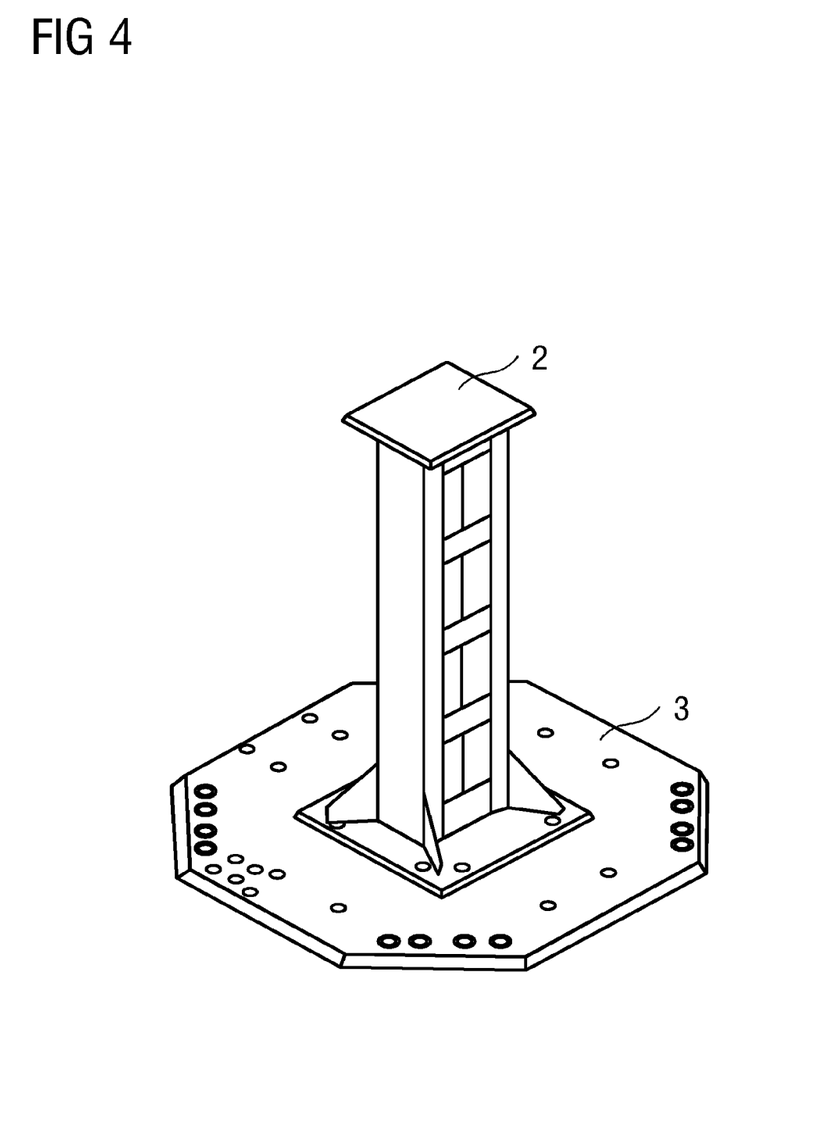
FIG. 4 represents the connection of the base plate with the equipment.

FIG. 4 depicts a connection of the base plate 3 with an exemplary upstanding electrical equipment 2 wherein the upstanding electrical equipment 2 is mounted on the base plate 3. The equipment 2 is affixed onto the base plate 3 by means of connecting and fixing means. The equipment 2 can be any one of a double and single chamber life tank high voltage AC circuit breaker, HVDC high speed switches, high voltage arresters, high voltage disconnectors, HVDC voltage dividers, high voltage single stand bus support, high voltage earthing switch or a high voltage pantograph. Any other equipment 2 can also be mounted and supported by the base plate 3. Only an exemplary supporting structure for an upstanding electrical equipment 2 is presented in FIG. 4, there may be many other types of supporting or mounting arrangements possible.

Although the invention has been described with reference to specific embodiments, this description is not meant to be construed in a limiting sense. Various modifications of the disclosed embodiments, as well as alternate embodiments of the invention, will become apparent to persons skilled in the art upon reference to the description of the invention. It is therefore contemplated that such modifications can be made without departing from the embodiments of the present invention as defined.

LIST OF REFERENCES

1 device
2 equipment
3 base plate
4 foundation plate
5 viscous damper
6 wire rope damper
7 support adapter
8 shake table adapter
9 angular fixtures
10 base plate connection point
11 base plate centre
12 base plate outer edge
13 angular fixture connection point
14 support adapter connection point
15 foundation plate connection point

The invention claimed is:

1. A device for supporting and damping equipment, the device comprising:
    a base plate;
    a set of support adapters;
    a set of viscous dampers connecting the base plate to the support adapters;
    a set of wire rope dampers bearing the base plate and connecting the base plate to the support adapters; and
    a set of shake table adapters, wherein the shake table adapters connect the support adapters to a shake table.

2. The device according to claim 1, wherein the set of support adapters connect the viscous dampers and the wire rope dampers to a foundation plate.

3. The device according to claim 2, wherein the viscous dampers are each arranged at an angle to the foundation plate.

4. The device according to claim 3, in which the angle of the viscous dampers to the foundation plate is 77 degrees.

5. The device according to claim 1, wherein at least one viscous damper and at least one wire rope damper are connected to the same support adapter.

6. The device according to claim 1, wherein the base plate is orthogonally shaped.

7. The device according to claim 1, further comprising a set of angular fixtures connecting the support adapters to the base plate by means of the viscous dampers.

8. The device according to claim 1, wherein the set of viscous dampers constitutes up to five viscous dampers per support adapter.

9. The device according to claim 1, wherein the equipment is one of a double and single chamber life tank high voltage AC circuit breaker, HVDC high speed switches, high voltage arresters, high voltage disconnectors, HVDC voltage dividers, a high voltage single stand bus support, a high voltage earthing switch or a high voltage pantograph.

10. The device according to claim 1, wherein the base plate comprises a base plate center and a base plate outer edge, and the wire rope dampers are connected to the base plate at a base plate connection point and wherein the distance between the base plate connection point and the base plate center is less than the distance between the base plate connection point and the base plate outer edge.

11. A device for supporting and damping equipment, the device comprising:
 a base plate;
 a plurality of support adapters in spaced relation beneath the base plate, each of the support adapters being fixedly attached to a top surface of a foundation plate;
 a plurality of sets of viscous dampers, each set of viscous dampers connecting the base plate to a support adapter; and
 a set of wire rope dampers, each wire rope damper connecting the base plate to a support adapter wherein each of the plurality of support adapters supports a set of viscous dampers and a wire rope damper.

12. The device according to claim 11, further comprising a set of shake table adapters, wherein the shake table adapters connect the support adapters to a shake table.

13. The device according to claim 11, wherein the base plate is orthogonally shaped.

14. The device according to claim 11, further comprising a set of angular fixtures connecting the support adapters to the base plate by means of the viscous dampers.

15. The device according to claim 11, wherein the set of viscous dampers constitutes up to five viscous dampers per support adapter.

16. The device according to claim 11, wherein the equipment is one of a double and single chamber life tank high voltage AC circuit breaker, HVDC high speed switches, high voltage arresters, high voltage disconnectors, HVDC voltage dividers, a high voltage single stand bus support, a high voltage earthing switch or a high voltage pantograph.

17. The device according to claim 11, wherein the base plate comprises a base plate center and a base plate outer edge, and the wire rope dampers are connected to the base plate at a base plate connection point and wherein the distance between the base plate connection point and the base plate center is less than the distance between the base plate connection point and the base plate outer edge.

18. The device according to claim 11, wherein the viscous dampers are each arranged at an angle to the foundation plate.

19. The device according to claim 18, in which the angle of the viscous dampers to the foundation plate is 77 degrees.

* * * * *